United States Patent [19]
Löhr et al.

[11] Patent Number: 5,578,135
[45] Date of Patent: Nov. 26, 1996

[54] CHEMO-MECHANICAL STRIPPING OF PAINT FROM PLASTIC PARTS

[75] Inventors: Karsten Löhr, Ulm; Bernd-Uwe Kettemann, Elchingen; Jörg Zürn, Ulm; Michele Melchiorre, Blaustein, all of Germany

[73] Assignee: Daimler-Benz, Stuttgart, Germany

[21] Appl. No.: 364,778

[22] Filed: Dec. 27, 1994

[30] Foreign Application Priority Data

Dec. 24, 1993 [DE] Germany .................. 43 44 582.9

[51] Int. Cl.⁶ .................. B08B 3/10; B08B 7/02; C23D 17/00
[52] U.S. Cl. .................. 134/7; 134/38; 134/10; 134/16; 134/19; 134/25.1; 134/29; 134/36
[58] Field of Search .................. 134/10, 25.1, 38, 134/7, 16, 19, 29, 32, 33

[56] References Cited

U.S. PATENT DOCUMENTS

| | | | |
|---|---|---|---|
| 4,379,724 | 4/1983 | Kashiwagi | 134/25.1 |
| 5,094,696 | 3/1992 | Orsen | 134/10 |
| 5,234,504 | 8/1993 | Peterson et al. | 134/25.1 |
| 5,255,859 | 10/1993 | Peacock et al. | 134/25.1 |
| 5,330,581 | 7/1994 | Syrinek | 134/25.1 |
| 5,372,650 | 12/1994 | Lahoda et al. | 134/25.1 |

FOREIGN PATENT DOCUMENTS

| | | |
|---|---|---|
| 0050486A1 | 4/1982 | European Pat. Off. |
| 53-94381 | 8/1978 | Japan . |
| 5-285952 | 11/1993 | Japan . |
| 1134967 | 11/1968 | United Kingdom . |
| 1445168 | 8/1976 | United Kingdom . |
| WO94/01491 | 1/1994 | WIPO . |

OTHER PUBLICATIONS

European Search Report dated May 8, 1995.

*Primary Examiner*—Zeinab El-Arini
*Attorney, Agent, or Firm*—Evenson, McKeown, Edwards & Lenahan, P.L.L.C.

[57] ABSTRACT

A process for stripping of used parts or reject parts, in particular of polycarbonate (PC) or of a polycarbonate blend, preferably with polybutylene terephthalate (PBT/PC), for the purpose of recycling the plastic. In this process the plastics parts are first mechanically comminuted to a pourable size and then are circulated together with anhydrous alkalified diethylene glycol or propylene glycol in a mass with mutual abrasion of the plastics chips at elevated temperatures of at least 50° C., preferably from 80° to 100° C., until complete removal of the paint. Thereafter the stripped plastics chips are separated from the stripping agent, flushed and then dried. The quantity of glycol added corresponds to from 1 to 10% of the volume of the mass to be treated, so that the circulated parts are only wetted by the glycol, but with stripping agent being circulated continuously through the treatment space of the mass from a relatively large reservoir. The circulation of the mass of parts is preferably carried out in a closable free-fall or positive mixer or in a rotary tube mixer. During the abrasive circulation the plastics parts are preferably admixed with abrasive particles whose specific apparent density corresponds roughly to the specific apparent density of the plastics parts.

24 Claims, 1 Drawing Sheet

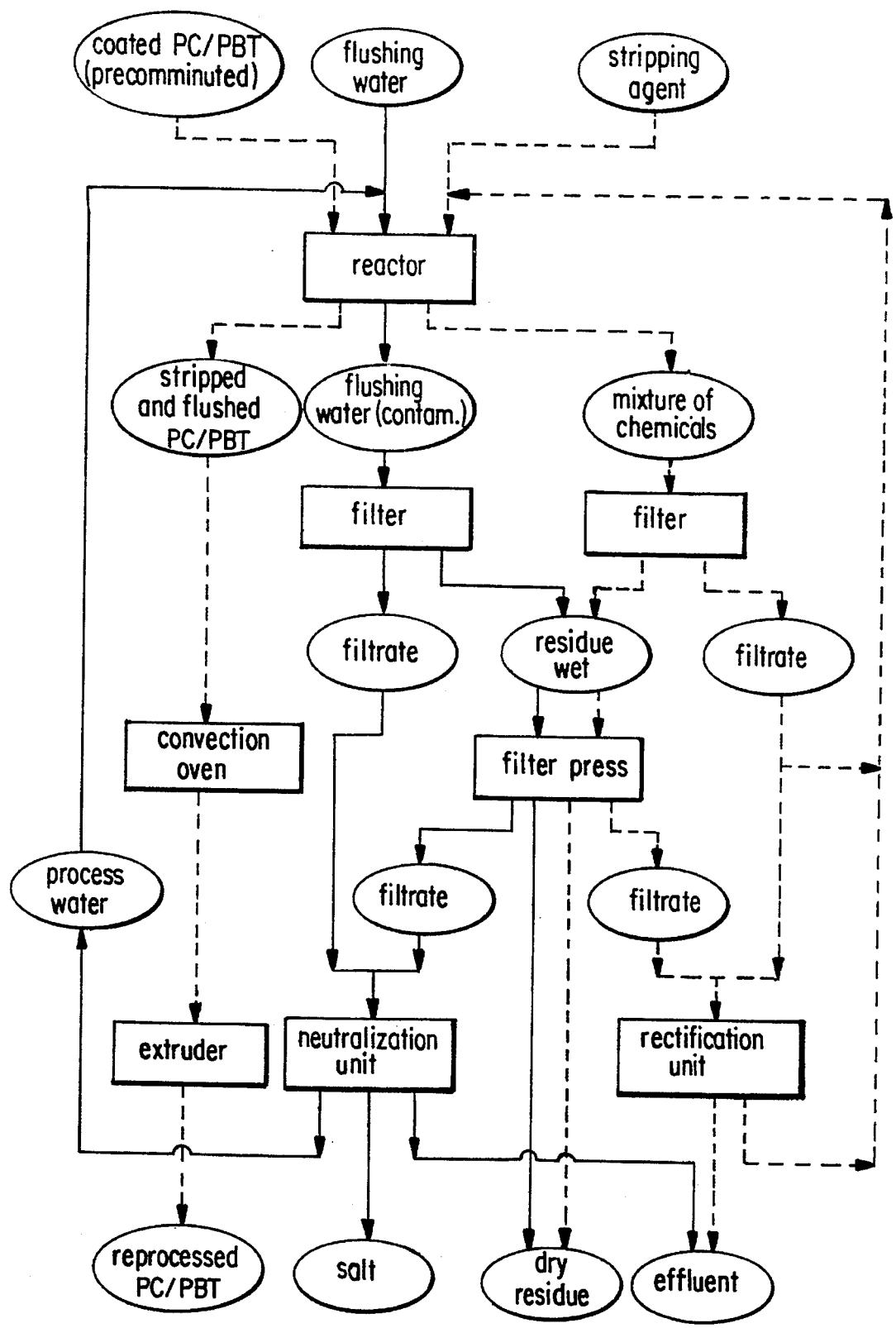

CHEMO-MECHANICAL STRIPPING OF PAINT FROM PLASTIC PARTS

BACKGROUND AND SUMMARY OF THE INVENTION

The invention relates to a process for the stripping of paint from plastics parts such as used parts or reject parts with the aim of recycling the stripped plastic, in which the plastics parts are first mechanically comminuted to a pourable size, in which the plastic chips are circulated at elevated temperature together with an alkalified glycol, and in which after a certain treatment time the stripped plastics chips are separated from the stripping agent, flushed and then dried. British Patent Document GB-B 1 134 967 describes a process of this general type.

In recent years there has been a continual increase in the use of plastics in the automotive industry. In order to adapt the plastics, for example polycarbonates, even better to their use in the automotive sector, their surfaces are coated. Coatings are used to afford protection, for example against environmental effects, to bumpers and other plastics parts which form an integrated component in the body, and to integrate these parts visually into the color scheme of the motor vehicle. The recycling of the materials mentioned gives rise to quite specific problems. The colored layer of two-component paints breaks down mechanically when the plastics are recycled into small tinsel-like particles of paint which lead to an impairment of the recovered raw materials, and consequently this material can then only be processed into low-grade products. The particles of paint which remain behind cause, for example, a mechanical weakening of articles produced from recycled material, since again and again they interrupt an integral material bond and constitute sites where cracks can start, in other words micronotches. Articles made from recycled plastic which has not been stripped beforehand have only a very low tensile strength and notched impact strength and a likewise very low tear strength and elongation at break in comparison to virgin plastic of the same type. For this reason and, on the other hand, because stripping is a comparatively expensive process, the stripping of used plastics has generally been abandoned and used parts of this kind have been disposed of in other ways.

In this context there has been no lack of attempts to develop different processes for the stripping of plastics.

In particle blasting processes, the consumption of abrasive agent for the stripping operation is a concomitant phenomenon which on the one hand causes an unfavorable rise in the consumption of the material for reprocessing operation and on the other hand, by the incorporation or diffusion of fragments of abrasive agent into the base material, leads to impairment of the recycled material. Moreover, uniform or complete paint removal cannot be achieved. Furthermore, in cases in which each workpiece is treated as a whole, then these processes have to be carried out individually and locally, and therefore manually, so that it is not possible to employ these processes in the stripping of used plastics at an acceptable level of cost.

Water blasting processes are unsuitable for plastics parts because of the low density and weight of the latter, since the plastics parts move away under the pressure of the blasting jet. In addition, the angle of the jet is an important parameter in these processes and cannot always be maintained when the surfaces are sharply curved or structured.

In the so-called melt filtering process in which the non-plastifiable constituents such as, for example, the particles of paint, are filtered off from the plastified polymer melt during extrusion, the degree of filter fineness required for adequate removal of the fine particles of paint and the considerable filter area required for this and the resulting high filter-area load are disadvantageous. According to investigations by the applicant, the high extrusion temperature which is required for satisfactory flowability through the filter and the marked differential pressure both degrade the polymer matrix of the plastic. In an expanded process, i.e., with combined abrasive treatment and filtering of the polymer melt, a large proportion of the paint is first removed by way of a cone-type press and a pin mill, in order to reduce the amount of residual paint before filtering, the required filter area in the subsequent melt filtration and the filter load during this filtration is large. An objectionable feature of this process is again the damage to the plastic, both by the severe abrasive processes and by the melt filtration.

In a process for stripping the paint from complete bumper panels, which process is recommended by one vehicle manufacturer, these panels are softened in an oven and pressed flat before the paint is abrasively removed by means of brushes. A disadvantage of this process for the treatment of whole plastics parts is that noncomminuted and therefore bulky plastics parts have to be collected and treated centrally. Such bulky parts have a very low transportation density, which has an adverse effect on the transport costs and on the gross weight to be transported in comparison with the ecological benefits.

Although conceivable, chemical stripping with halogenated hydrocarbons (chlorofluorocarbons, chlorocarbons) is prohibited by law because of the environmental damage caused by these substances.

Another vehicle manufacturer specifics a process for the chemical stripping of plastics parts which uses an organic sulphide solution at from 80° to 100° C. This solution is not environmentally compatible. In addition, because of the ether and alcohol components there is the danger of autoignition or explosion, and therefore the possibility of simultaneous mechanical treatment can also be abandoned.

English Patent 1 134 967 describes a process for the recovery of film wastes in the photographic and film industry, which wastes consist of apparently expensive polyester, specifically and preferably poly-1,4-cyclohexanedimethylene terephthalate, thus making recovery worthwhile. The photosensitive layer can, for example, be softened in hot water and removed. However, before recovery of the base material of the film it is also necessary for an approximately 25 μm, thin layer of adhesion promoter to be removed. And the layer of adhesion promoter consists in turn of a copolymeric vinylidene halide, preferably a copolymeric vinylidene chloride, which contains;:

from 30 to 98% by weight, preferably at least 35% by weight, of vinylidene halides, from 0.5 to 40% by weight, preferably from 10 to 15% by weight, of acrylonitriles and/or preferably an additional 1 to 12% by weight of alkyl esters of an acrylic, methacrylic or itaconic acid, and from 1 to 25% by weight of an acrylic, methacrylic or itaconic acid.

In order to remove this layer of adhesion promoter, the film material, which has been comminuted to chips having a lateral length of about 1 cm, is brought into contact with at least six times its weight, preferably from 10 to 50 times the quantity, of glycol which has been alkalified with sodium hydroxide or potassium hydroxide solution, at least 90° C. and preferably from 145° to 155° C.; in other words, it is suspended in the alkalified glycol and this suspension is stirred or circulated for a length of time, preferably about 2 minutes, until at least the majority of the chips have been stripped. Subsequently the stripped chips and the glycol are separated from one another. According to the proposal, the glycol to be used is preferably ethylene glycol and specifically 1,4-cyclohexanedimethanol, in other words precisely that glycol which in its chemical structure corresponds to the specific polyester of the base material to be stripped. By means of the glycol which is recommended for the chemical stripping and is chemically related to the base material, this base material, at least at elevated temperature, is broken up or dissolved and in this way the bond with the layer to be removed is destroyed or broken, the layer to be removed coming off in sheets. In this process a partial breaking-up or dissolution of the base material is not merely tolerated but indeed is a specific aim. And indeed the upper limit recommended for the treatment temperature is a temperature at which approximately 5% by weight of the base material may be dissolved, but in any case less than about 200° C. The proposed stripping process hails from a time (1966) when ecological considerations did not as yet play any decisive role in process design, but instead considerations of cost were the priority. Indeed, the use of ethylene glycol in such large amounts is highly objectionable from an ecological point of view, since this glycol is classified as "slightly toxic" on the toxicity scale.

An object of the invention is to specify a process which achieves complete removal of a coating from plastics parts with minimal damage to the plastics material while using environmentally compatible means and with a low consumption of material and energy, and which, at least in the case of plastics parts which are pourable, or have been precomminuted so as to render them pourable, can be carried out in a process which allows automation.

Starting from the process on which the generic art is based this object is achieved in accordance with the invention by means of a process wherein, in order to strip the coated plastics parts, they are circulated together with a stripping agent of an anhydrous, alkalified diethylene glycol or propylene glycol, in a mass with mutual abrasion of the plastics parts at at least 50° C., the quantity of stripping agent added being from 1 to 10% of the volume of mass to be treated, so that the circulated parts are only wetted by the stripping agent. In especially preferred embodiments, the circulation is carried out at a temperature between 80° C. and 100° C. The chemical dissolution effect is brought about by means of an environmentally compatible two-component mixture of, on the one hand, diethylene glycol and/or propylene glycol and, on the other hand, potassium hydroxide and/or sodium hydroxide. Diethylene glycol is in water hazard class zero. After neutralization it is acceptable to pass on potassium hydroxide, as a dietary salt solution, for effluent treatment. In the course of stripping the polycarbonate is hydrolysed, a reaction which does not liberate any by-products classified as objectionable. The mechano-abrasive effect is designed so that no damage occurs to the plastics material but at the same time so that the paint is removed on all sides of the particle, irrespective of the specific particle form. Treatment in the reactor is carried out automatically and permits the stripping of various particle forms after appropriate precomminution. The reactor is closed during the treatment in order to save heat energy and to minimize the loss of chemicals by evaporation.

The advantages of the inventive embodiment of the stripping process are as follows:

complete removal of the paint from the plastics parts can be achieved;

minimal damage to the plastics parts;

minimal consumption of energy and processing auxiliaries;

low process costs in comparison to the new value of the recycled material;

only environmentally unobjectionable means are used;

no ecologically objectionable emissions or residues;

the process can be automated and can be operated continuously.

The use of the process described is appropriate for all cases in which a polycarbonate or polycarbonate blend can be subjected to high-grade material recycling by stripping. This is the case in particular for the bumpers of the top car class, which consists of this material to the extent of more than 50% and more than 4 kg per part.

Other objects, advantages and novel features of the present invention will become apparent from the following detailed description of the invention when considered in conjunction with the accompanying drawings.

BRIEF DESCRIPTION OF THE DRAWING

The single drawing FIGURE is a schematic flow diagram depicting a process in accordance with a preferred embodiment of the invention.

DETAILED DESCRIPTIONS OF THE PREFERRED EMBODIMENTS

The text below reports on a trial operation of a stripping operation for bumpers at the Applicant Company (assignee of this application) on a semi-industrial scale, on the basis of a flow diagram which is shown in the single drawing FIGURE.

The front and rear bumpers of motor vehicle consist of a large number of individual components made from various materials. From the dealerships and contract partners of the Applicant Company the old bumpers from vehicles involved in accidents which have been repaired are picked up by a waste management company, collected centrally and broken down into the various individual parts which are sorted by material. The largest component of the bumpers hailing from the Applicant Company is the panelling; on most types of vehicles this panelling consists of a plastics blend of polycarbonate and polybutylene terephthalate (PC/PBT or PBT/PC), which is to be stripped in the process example described below. However, it should be pointed out now that the stripping process described is also suitable for other coated plastics, for example EUPP.

The aim of reprocessing coated components at a high level is to remove the paint completely. For this purpose the bumpers are first precomminuted to a pourable size; in this context an advantageous spectrum of sizes is one where the greatest edge length or overall length of the parts measures less than 20 cm for about 90% by weight of the parts and measures more than 1 mm for at least 99% by weight of the parts. Instead of specifying a size classification the precommminuted parts can also be classified by weight: in this case the aim would be a spectrum of parts in which about 90% by weight of the parts weighed less than 50 g each and at least 99.5% of the parts weighed more than 5 mg each. The approximate limit for the upper size of parts is an approximate marker for the region below which a fairly homogeneous and ordered pouring and circulation of the parts is still possible. Going below the lower limit would be disadvantageous because degradation of the parts and/or of the plastic only remains still tolerable above this limit. The panelling of used and dismantled bumpers was comminuted by passing it a plurality of times through a twin-shaft cutter with low thermal and mechanical stress to give uniform chips having an edge length of about 25 mm and a narrow spectrum of parts. These parts could be treated in the reactor without difficulty.

The PC/PBT or PBT/PC pieces obtained by comminution are placed in a reactor in 50 kg batches. For this purpose it was in fact possible to use a finishing-grinding unit from Spaleck which is normally used in the manufacture of parts produced en masse, for deburring, cleaning, polishing or similar surface treatments. The inner lining of this finishing-grinding unit was modified to make it resistant to chemicals and heat. In addition, the finishing-grinding unit was supplemented to meet the requirements for the reactor with a circulation pump apparatus, a heating device and a closure cap for the filling aperture. The contents of the vessel are set in a rotationally symmetrical, circulatory movement with a funnel-shaped space in the middle by means of the stirring paddles at the bottom of the finishing-grinding unit used. In this way the amount of mechanical energy supplied to the mass of particles can be adjusted in a simple manner.

It is in fact conceivable, apart from the necessary addition of chemicals and the elevation of temperature, only to treat the precomminuted plastics parts alone in the reactor. However, it has proved advantageous to add abrasive particles to the mass of parts, these particles being produced from a material which is resistant to alkali and glycol, in particular from stainless steel plate. However, in comparison with the mass of plastics parts these abrasive particles must not be too light and must not be too heavy, so that they do not separate out during circulation. It appears to be advisable for the co-circulated abrasive particles to have a specific apparent density which corresponds to from 0.2 to 5 times, preferably from 0.5 to 2 times, the specific apparent density of the plastics parts. In this context commercially available packing media for washing towers or the like are suitable. As far as the amount added is concerned, it is recommended to add the abrasive particles to the circulating mass in such a quantity that, based on the overall volume of the mass, the proportion of abrasive particles is from about 1 to 20% by volume, preferably from 5 to 10% by volume thereof.

While thermal and mechanical energy is supplied, the plastics parts are treated in the reactor with a liquid mixture of chemicals for about 15 minutes, the quantity of mixture of chemicals in the reactor being from 1 to 10% of the volume of the mass to be treated, such that the circulated parts are only wetted by the mixture and in no way are suspended in it. This mixture of chemicals is continuously passed through the reactor and pumped in circulation at a volume flow rate of from about 5 to 10 l/min (liters/minute), a chemical reservoir of about 40 l being employed in this circulation system. The mixture of chemicals employed is, preferably anhydrous, alkalified diethylene glycol or propylene glycol. After this period the paint is detached and is present in the chemicals in part in the form of solid, suspended particles.

The chemicals are drained off from the reactor and the paint particles present in them are filtered out or centrifuged. The mixture can be employed approximately ten times although with each passage a certain amount is lost, remaining dispersed over the plastics parts in the reactor.

After being used ten times the mixture of chemicals is passed to a rectification plant. A large proportion of the chemicals is recovered using this plant, while the reminder is rendered inert in the on-site effluent treatment plant which is present at the works. The products from this reprocessing operation, water and salt, are classified as not hazardous in water and can be discharged into the sewer system without problems.

In order to separate the residual chemicals remaining in the reactor from the plastics parts, centrifugation is carried out after each batch and the reactor is then flushed with 50 l of process water. Particles of paint which have still not been removed from the reactor with the chemicals are then flushed out with water.

The particles of paint present in chemicals and water are filtered out. Residual moisture is pressed out of the filter residues in a filter press. The filtrates pass back into the liquid circuits, while the "dried" residues, comprising about 0.5 kg of paint, 1 kg of water and 0.05 to 0.1 kg of a mixture of chemicals per batch, have to be disposed of separately.

After each passage the process water is purified to remove chemicals in a neutralization unit. This procedure allows the water to be used five times before becoming unusable as flushing liquid. It can then be discharged to the on-site effluent treatment plant at the works as unproblematical effluent.

The stripped and flushed PC/PBT or PBT/PC parts are centrifuged, removed from the reactor and, after separating off the abrasive particles, are placed in a convection oven for drying. The stripped plastics parts are subsequently stabilized in an extruder, granulated and packed ready for dispatch.

The operation of the plant for processing PC/PBT requires energy, personnel, transport resources, auxiliaries, maintenance and waste disposal. Whereas the costs for personnel and maintenance are to a certain extent independent of the level of utilization, the costs for energy, transport, auxiliaries and disposal are dependent on the throughput and enter into the cost calculation. However, experience with the trials carried out on the semi-industrial scale by the applicant makes it possible to conclude that the recovery costs, including the direct and indirect costs of stripping, are about 20 to 40% of the costs of procuring the new plastic.

Material analysis of the plastic recycled in the manner described by melt index testing resulted in values which compared with those of the original characteristics of the components. The good properties of the stripped and reprocessed PC/PBT make it possible to reuse the material, at least as an admixture in the production of new bumpers. This application possibility is evidence of the high quality of the recycled material, since the applicant demands the very highest quality for bumpers. In accordance with the cautious estimation of experts, a proportion of about 10% of recycled material in the bumper material will have no adverse effect on the quality of the components; proportions of recycled material which are substantially higher than this would appear to be entirely realistic aims.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for stripping a coating from coated plastics parts to obtain recycled stripped plastic, comprising the steps of:

first mechanically comminuting the coated plastics parts into plastic chips of a pourable size;

mixing the plastic chips with a stripping agent of anhydrous alkalified glycol, selected from the group consisting of diethylene glycol or propylene glycol, wherein the stripping agent is added in an amount of from 1 to 10% of the volume of plastic chips to be recycled, so that the plastic chips are only wetted by the stripping agent;

circulating the plastic chips with the stripping agent at a temperature of at least 50° C. for a predetermined time to strip the coating from the plastic chips by mutual abrasion to obtain stripped plastic chips without damaging the plastic chips;

separating the stripped plastic chips from the stripping agent; and flushing and drying the striped plastic chips.

2. Process according to claim 1, wherein said circulating is conducted at a temperature of between 80° and 100° C.

3. Process according to claim 2, wherein said plastics parts are made of one of polycarbonate (PC) and a polycarbonate blend.

4. Process according to claim 3, wherein said polycarbonate blend is polybutylene terephthalate (PBT/PC).

5. Process according to claim 2, wherein the stripping agent is conveyed from a reservoir continuously through a treatment space and is circulated in a circuit.

6. Process according to claim 5, wherein the reservoir of stripping agent present in the circuit corresponds in volume terms to from 0.3 to 5 times the volume of plastic chips to be treated located in the treatment space.

7. Process according to claim 5, wherein heat necessary for the circulating step is supplied at least in part indirectly by way of the stripping agent, this stripping agent being heated outside the treatment space in the circuit.

8. Process according to claim 5, wherein the reservoir of stripping agent present in the circuit corresponds in volume terms to from 0.7 to 2 times the volume of plastic chips to be treated located in the treatment space.

9. Process according to claim 2, wherein the plastics parts are first mechanically comminuted to a size such that the largest edge length or overall length of the parts measures less than 20 cm for about 90% by weight of the parts and measures greater than 1 mm for at least 99% by weight of the parts.

10. Process according to claim 2, wherein the plastics parts are first mechanically comminuted to a size such that about 90% by weight of the parts weigh less than 50 g each and at least 99.5% of the parts weigh more than 5 mg each.

11. Process according to claim 2, wherein the plastics parts are circulated in one of a closable free-fall mixer, a positive mixer, and a rotary tube mixer.

12. Process according to claim 11, wherein from about 10 to 1000 kg of plastic chips or a volume of from 25 to 2500 l of plastic chips are treated per batch.

13. Process according to claim 2, wherein the plastic chips are circulated in the presence of abrasive particles which are produced from a material which is resistant to alkali and glycol.

14. Process according to claim 13, wherein the abrasive particles which are circulated with the plastic chips have a specific apparent density which corresponds to from 0.2 to 5 times the specific apparent density of the plastic chips.

15. Process according to claim 13, wherein the abrasive particles are added in a quantity such that, based on the volume of the plastic chips, the proportion of abrasive particles is from 1 to 20% by volume.

16. Process according to claim 13, wherein the circulating step is carried out in batches in a discontinuously operating mixer.

17. Process according to claim 16, wherein the batches are each treated for from 5 to 30 minutes.

18. Process according to claim 16, wherein the batches are each treated for from about 10 to 20 minutes.

19. Process according to claim 13, wherein the abrasive particles which are circulated with the plastic chips have a specific apparent density which corresponds to from 0.5 to 2 times the specific apparent density of the plastic chips.

20. Process according to claim 13, wherein the abrasive particles are added in a quantity such that, based on the volume of the plastic chips, the proportion of abrasive particles is from 5 to 10% by volume.

21. Process according to claim 13, wherein the material is stainless steel plate.

22. Process according to claim 2, wherein the circulating step is carried out in batches in a discontinuously operating mixer.

23. Process according to claim 22, wherein the batches are each treated for from 5 to 30 minutes.

24. Process according to claim 22, wherein the batches are each treated for from about 10 to 20 minutes.

* * * * *